United States Patent
Meruva et al.

(10) Patent No.: US 10,691,093 B2
(45) Date of Patent: Jun. 23, 2020

(54) CONTROLLER PROGRAMMING MIGRATION AUTOMATION

(71) Applicant: Honeywell International Inc., Morris Plains, NJ (US)

(72) Inventors: Jayaprakash Meruva, Bangalore (IN); Nagesh Narayanappa, Bangalore (IN); Amruth Hiremath, Bangalore (IN); Andrew David Halford, Manchester, MD (US); Cary Leen, Hammond, WI (US); Roy Alan Kolasa, Kansas City, MO (US)

(73) Assignee: Honeywell International Inc., Morris Plains, NJ (US)

( * ) Notice: Subject to any disclaimer, the term of this patent is extended or adjusted under 35 U.S.C. 154(b) by 459 days.

(21) Appl. No.: 15/189,984

(22) Filed: Jun. 22, 2016

(65) Prior Publication Data

US 2017/0371309 A1 Dec. 28, 2017

(51) Int. Cl.
G05B 19/042 (2006.01)

(52) U.S. Cl.
CPC ............ *G05B 19/0426* (2013.01); *G05B 2219/23258* (2013.01); *G05B 2219/25428* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 10,372,112 B2* | 8/2019 | Krishnamurthy | G06F 9/455 |
| 2007/0226685 A1* | 9/2007 | Kaakani | G06F 8/656 717/108 |
| 2009/0088902 A1* | 4/2009 | Williams | F24F 11/30 700/278 |
| 2012/0117416 A1* | 5/2012 | McLaughlin | G06F 11/1658 714/4.11 |
| 2012/0130679 A1* | 5/2012 | Fadell | G05D 23/1902 702/183 |
| 2012/0246590 A1* | 9/2012 | D'Souza | G05D 23/1902 715/771 |
| 2014/0091153 A1* | 4/2014 | Stefanski | G05D 23/1917 236/1 C |
| 2015/0144705 A1* | 5/2015 | Thiruvengada | F24F 11/30 236/1 C |
| 2015/0163945 A1* | 6/2015 | Barton | F24F 11/006 361/809 |
| 2016/0103431 A1* | 4/2016 | Ganapathi | G05B 11/011 700/20 |

* cited by examiner

*Primary Examiner* — Benjamin P Sandvik
(74) *Attorney, Agent, or Firm* — Seager Tufte Wickhem LLP

(57) ABSTRACT

Devices, systems, and methods for controller programming migration automation are described herein. One device includes instructions executable to receive controller programming information associated with a first controller of a building system, wherein the received controller programming information is of a first information type, convert the received controller programming information to a second information type associated with a second controller of the building system, based, at least in part, on a set of conversion rules particular to the first controller and the second controller, and generate a report including information associated with the conversion.

20 Claims, 3 Drawing Sheets

CONTROLLER PROGRAMMING MIGRATION AUTOMATION

TECHNICAL FIELD

The present disclosure relates to devices, systems, and methods for controller programming migration automation.

BACKGROUND

One or more building systems can be installed in a building to allow for the management of aspects of the building. Building systems can include, for example, heating, ventilation, and air conditioning (HVAC) systems, access control systems, security systems, lighting systems, and fire systems, among others. A building system can refer a single building system (e.g., an HVAC system) and/or a system that manages a number of building systems (e.g., a building management system (BMS)).

Each building system typically includes a plurality of controllers. When these existing controllers approach the end of their lives, and/or if improved controllers are to be installed, the existing controllers may be replaced. For instance, new controllers using open protocol may be available that can increase compatibility with multiple equipment vendors and can connect to value-added services.

Previous approaches to migrating to new controllers for a building system may involve a "rip and replace" approach in which new controllers are installed and the entire system is reconfigured with new wiring. This approach may be time-consuming and may render portions of a building unsuitable for people during times in which HVAC systems are down, for instance.

Moreover, existing systems may have been fine-tuned over a substantial period of time in order to optimize performance and/or operations of the system(s). Previous approaches that start from scratch with new devices and/or wiring may involve a lengthy re-calibration process and may be unable to leverage previously-determined efficiencies.

DETAILED DESCRIPTION

Figure 1A:
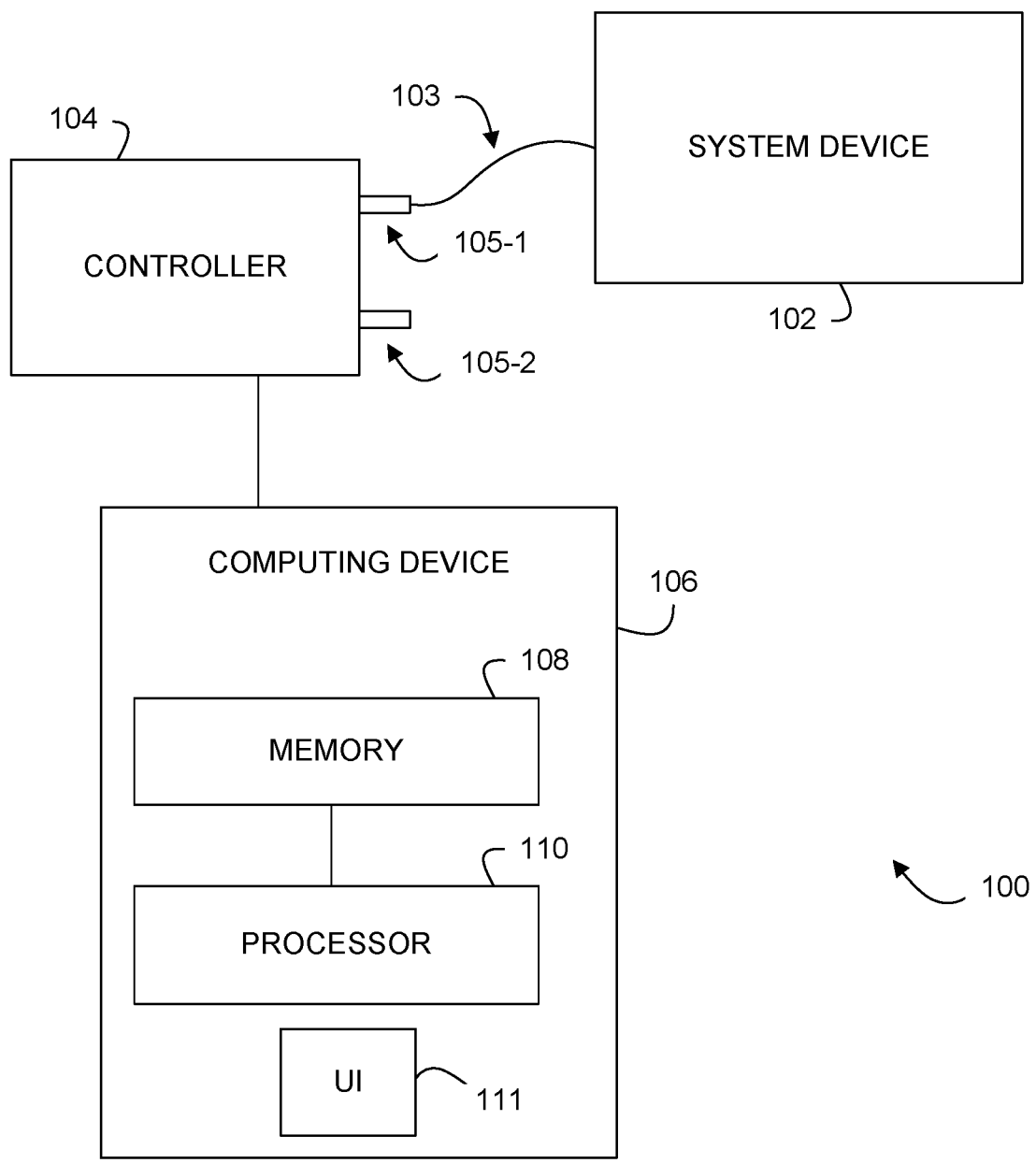
FIG. 1A illustrates a system for controller programming migration automation in accordance with one or more embodiments of the present disclosure.

Controller programming migration automation is described herein. For example, one or more embodiments include the execution of computer-readable instructions to receive controller programming information associated with a first controller of a building system, wherein the received controller programming information is of a first information type, convert the received controller programming information to a second information type associated with a second controller of the building system, based, at least in part, on a set of conversion rules particular to the first controller and the second controller, and generate a report including information associated with the conversion.

Embodiments of the present disclosure can enable the migration from legacy (e.g., existing, installed, old, etc.) controllers to new controllers (e.g., upgraded controllers) by converting legacy programming to new programming. The conversion can, in some embodiments, be carried out automatically (e.g., without user input). The conversion can obviate the need to re-wire existing field devices (system devices, e.g., sensors, actuators, input/output (I/O) devices, etc.) and/or re-calibrate the system. Accordingly, embodiments herein can maintain the benefits associated with fine-tuned efficiencies of existing systems.

For example, in some existing legacy systems, field technicians may spend hundreds or thousands of hours calibrating existing field devices. The calibration may involve the fine-tuning of programming (e.g., controller logic) over a period of several years to optimize the performance of the system. Embodiments of the present disclosure can extend these learned efficiencies to new controllers rather than discarding them and starting over.

New controllers may differ from legacy controllers in a number of manners. For instance, new controllers may include different numbers, configurations, and/or assignments of I/O points than their legacy counterparts. In addition, new controllers may include different calibrated offset values, time programs, and/or control logic than their legacy counterparts. Embodiments of the present disclosure can reconcile these differences by mapping the programming of legacy devices to programming of new devices. Thus, the new controllers can be installed without reconfiguring field devices or having to replace cables and/or wiring.

Because embodiments herein allow for the replacement of a legacy controller with a new, different controller, costs involved with migrating to a new system can be incurred in a stepwise fashion. For instance, in previous approaches, a legacy controller may not be compatible with a new controller that uses a disparate protocol, for instance, and thus all controllers may need to be simultaneously replaced in order for the system to function properly. In contrast, embodiments of the present disclosure allow new controllers to coexist in the system with legacy controllers and provide seamless functionality during the transition. Controllers can be replaced one-by-one, if desired, rather than all at once. As a result, funds can be better allocated because costs can be spread over a longer time period.

Embodiments of the present disclosure can receive programming information associated with (e.g., compatible with and/or executable by) legacy controllers. Discussed further below, "programming information" can include project documentation files, binary files, and/or a set of executable instructions (e.g., software) itself, which may be stored in a database. Using a set of conversion rules, embodiments herein can map the legacy programming information to "new" programming information compatible with new controllers.

In effect, a technician can disconnect the legacy controller and connect a new controller in its place using the existing wiring. The new controller can provide the benefits of a new controller (e.g., the use of open protocol that increases compatibility with multiple equipment vendors and/or the ability to connect to value-added services) while continuing to perform the functionalities of the legacy controller.

The terms "legacy" and "new" as referred to herein are used relationally and are not to be taken in a limiting sense. For instance, a legacy controller can refer to an already-installed (e.g., existing) and/or "old" controller that controls one or more system devices. System devices, sometimes referred to herein as "field devices," are devices of a building system that can be electrically connected to, and/or controlled by, a controller. System devices can include sensors and/or actuators, for instance, among other devices. A new controller refers to a controller that is to replace a legacy controller, or to which a legacy controller is to be migrated. A new controller may offer increased functionality with respect to a legacy controller, though embodiments of the present disclosure are not so limited. Programming information, which is sometimes referred to herein as "programming" can refer to project documentation files, binary files, and/or executable instructions (e.g., software) itself.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of building systems" can refer to one or more building systems.

FIG. 1A illustrates a system 100 for controller programming migration automation in accordance with one or more embodiments of the present disclosure. The system 100 can be located in a building, for instance, though embodiments of the present disclosure are not so limited. A building can refer to one or more structures, businesses, homes, plants, facilities, hospitals, refineries, etc.

As shown in FIG. 1A, the system 100 can include a legacy controller 104 (referred to herein as "controller 104"). The controller 104 can be a device configured to control operations of one or more devices of a building system such as, for instance, system device 102 illustrated in FIG. 1A. For example, the controller 104 can be a building management system (BMS) controller, a controller particular to a device (e.g., a variable air volume (VAV) controller), a zone controller, a unitary controller, and/or a plant controller, among other types of controllers. Though one controller is shown in FIG. 1A, embodiments of the present disclosure are not so limited. In some embodiments, the controller 104 can be one of the following models: XL500, XL5010B, XL5010C, XCL5010, XL800, XL50, XL80, XL20, XL600, XL100, etc. and can include one or more I/O modules such as, for example, XF521, XF522, XF523, XF524, XF526, XF527, XF528, XF529, XFL52x series, etc., which can communicate over C-Bus and/or local operating network (LON) protocols.

A building system can be an HVAC system, an access control system, a security system, a lighting system, or a fire system, among others. The building system can include one or more devices (e.g., system device 102) (e.g., I/O devices, field devices, etc.) such as, for example, a sensor, an actuator, an air handling unit, a variable air volume (VAV) device, a thermostat, a security camera, an access control device, and an alarm. A single system device 102 is illustrated in FIG. 1A, though embodiments of the present disclosure are not limited to a particular number of system devices. Where reference is made to the system device 102, it is to be understood that such reference may similarly apply to multiple system devices The system device 102 can be managed by the controller 104 and can participate in a network (e.g., a connected building system) of other devices. The devices can be wired and/or wirelessly connected to the controller 104 such that the devices and the controller can communicate information with one another. In some embodiments, the controller 104 can control operations of the system device 102.

As shown in FIG. 1A, the controller can include a point 105-1 and a point 105-2, sometimes cumulatively referred to as "points 105." One or both of the points 105 can be an input point, an output point, or a combination thereof (e.g., an I/O point). Herein, where not specifically indicated, an "I/O point" may refer to an output point, an input point, or an input/output point. It is noted that while two points are illustrated in FIG. 1A, embodiments of the present disclosure are not so limited; devices in accordance with embodiments herein can have more or fewer than two points. One or more of the points 105 can be an analog point. One or more of the points can be a digital point.

Additionally, though the points 105 are shown in FIG. 1A as being physically included in the controller 104 as "onboard" points, embodiments herein are not so limited. In some embodiments, the points 105 can be located on an I/O bus, for instance, in communication with the controller 104. For example, one or more points can be included in in I/O module along an I/O bus connected to the controller 104.

The system device 102, as shown in FIG. 1A, can be connected to the controller 104 at one or more of the points 105 by wiring 103. Though a single wire is shown connecting the system device 102 to the controller 104, more than one wire may be used to connect system devices to controllers in accordance with one or more embodiments of the present disclosure. Additionally, embodiments of the present disclosure do not limit the wiring 103 to a particular type of wiring. Further, connections between such devices may not include wires and/or may be wireless.

As shown in FIG. 1A, the system 100 can include a computing device 106. In some embodiments, the computing device 106 can be local to the building in which the controller and/or the system device 102 is installed (e.g., inside the building). In some embodiments, the computing device 106 can be remote with respect to the building. In some embodiments, the computing device 106 can be a remote server (e.g., a cloud-hosted service). In some embodiments, the computing device 106 can be a mobile device. In some embodiments, the computing device can be a local control panel and/or operator station.

The computing device 106 can include a memory 108 and a processor 110 configured to execute executable instructions stored in the memory 108 to perform various examples of the present disclosure, for example. That is, the memory 108 can be any type of non-transitory storage medium that can be accessed by the processor 110 to perform various examples of the present disclosure. For example, the memory 108 can be a non-transitory computer readable medium having computer readable instructions (e.g., computer program instructions) stored thereon that are executable by the processor 110 to perform various examples of the present disclosure.

The memory 108 can be volatile or nonvolatile memory. The memory 108 can also be removable (e.g., portable) memory, or non-removable (e.g., internal) memory. For example, the memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although the memory 108 is illustrated as being located within the computing device 106, embodiments of the present disclosure are not so limited. For example, the memory 108 can also be located internal to another computing resource (e.g., enabling computer readable instructions to be downloaded over the Internet or another wired or wireless connection).

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure. For instance, the controller 104 can include logic to perform various functions in accordance with embodiments of the present disclosure.

As previously discussed, the computing device 106 can be a mobile device in some embodiments. The mobile device can be a client device carried or worn by a user. For example, the mobile device can be a phone (e.g., smartphone), personal digital assistant (PDA), tablet, and/or wearable device (e.g., wristband, watch, necklace, etc.). The mobile device can include one or more software applications (e.g., apps) which can define and/or control communications between the mobile device, the controller 104, and/or a remote computing device (e.g., a cloud hosted service). Apps may be received by the mobile device from one or more other computing devices. Apps may be launched by a user and/or responsive to some other condition. In some embodiments, apps can be executing as background apps.

As shown in FIG. 1A, the computing device 106 can also include a user interface 111. The user interface 111 can include a display (e.g., a screen). The display can be, for instance, a touch-screen (e.g., the display can include touch-screen capabilities). The user interface 111 can provide (e.g., display and/or present) information to a user of the computing device 106.

Additionally, the computing device 106 can receive information from the user of computing device 106 through an interaction with the user via user interface 111. For example, computing device 106 (e.g., the display of user interface 111) can receive input from the user via the user interface 111. The user can enter the input into computing device 111 using, for instance, a mouse and/or keyboard associated with the computing device 106, or by touching the display of the user interface 111 in embodiments in which the display includes touch-screen capabilities (e.g., embodiments in which the display is a touch screen).

The computing device 106 can be connected to the controller 104 in a wired and/or wireless manner such that information (e.g., programming information) can be communicated from the controller 104 to the computing device 106, and/or from the computing device 106 to the controller 104.

For example, the computing device 106 can receive programming information (e.g., controller programming information) associated with the controller 104. The programming information may be of a "first information type" (e.g., legacy programming) in that it can be compatible with, and/or executable by, the controller 104. In some embodiments, the programming information is received from the controller 104. In some embodiments, the programming information is received from another source (e.g., a cloud-hosted service, a database, etc.). In some embodiments, the programming information is in a project documentation format. For example, the executable instructions of the controller 104 can be exported into a documentation format (e.g., a file). The documentation format can be parsed based on parsing rules and converted by the computing device 104 (discussed below).

In some embodiments, the programming information can be in a binary file format. For example, binary files can be imported from the controller 104. Data can be extracted (e.g., reverse engineered) from these files and converted by the computing device 104. In some embodiments, the programming information is legacy software (e.g., executable instructions persisted in a database) executed by the controller 104 to control the system device 102.

In accordance with one or more embodiments of the present disclosure, the computing device 106 can convert the received programming information to a second (e.g., different and/or new) type of controller programming information. For instance, the received programming information can be converted from a first format type that is compatible with the controller 104 (e.g., a legacy controller) to a second format type that is compatible with a new and/or upgraded controller, such as the controller 107 described in connection with FIG. 1B.

In order to perform the conversion, the computing device 106 can utilize a set of conversion rules. In some embodiments, the set of conversion rules can apply to a plurality of different types of legacy controllers and a plurality of different types of new controllers. Thus, converting in some instances can include utilizing a portion of the set of rules that is particular to the controller 104 (the legacy controller) and the controller that is to replace the controller 104 (the new controller).

The rules can include rules that correlate one or more aspects of the programming logic of the controller 104 with one or more aspects of the new controller. The new controller may be a Comfort Point Open controller (CPO) in some embodiments. For example, the new controller may be one of the following models: CP-IPC, CPO-PC-6A, CP-SPC, CPO-R, CP-IRM, etc. The rules can include rules defining which type(s) of legacy controllers are mapped to which type(s) of new controllers.

The rules can define a mapping between input/output points of the first controller (e.g., points 105) and input/output points of the new controller. For instance, the rules can define what types of I/O modules (e.g., XF52x series, XFL52x series, etc.) are mapped to bus modules of new controllers (e.g., XF82x series panel bus, field bus, and/or CP-EXPIO bus modules).

The rules can include rules associated with converting switching table logic of the received programming information of the controller 104 to control logic of the programming information of the new controller. The rules can include rules associated with converting a first time schedule of the received programming information of the controller 104 to a second time schedule of the programming information of the new controller.

In some embodiments the rules are configured such that they can be modified by a user (e.g., using the UI 111). For instance, default rules can be provided along with an option to modify those rules. In some embodiments, the rules can be configured such that they are not modifiable by a user. In some instances, the set of rules can include a first subset of rules modifiable by user input and a second subset of rules not modifiable by user input. For example, improper user modification may lead to conflicts in some instances. In cases where rules are configured to be modified, they can be modified before the conversion begins. Thus, in a system with many controllers, the rules can be set and applied allowing each of the sets of programming information to be converted into new programming information automatically (e.g., without user input).

The conversion can be carried out responsive to a user command (e.g., made using the UI 111). In some embodiments, programming information of each controller of the building system can be converted. In some embodiments, programming information of less than all controllers of the building system can be converted. In some embodiments, for example, programming information of a single controller can be converted. A list of controllers can be provided such that a user may be able to select a desired controller for conversion.

During and/or after conversion, the computing device 106 can perform conflict and/or violation analysis to ensure that the functionality provided by the controller 104 will be provided in the new controller. Responsive to a conflict being determined, the conflict can be provided (e.g., via the UI 111). A user may be provided with different options for correcting the conflict and/or violation.

Conflicts may take different forms. In some embodiments, certain characters of the programming information associated with the controller 104 may not be allowed in the programming of the new controller. In some embodiments, certain I/O characteristics may be allowed in the programming information of the controller 104 but not supported by the programming of the new controller. In some embodiments, the programming information of the controller 104 may include a component (e.g., a switching table) that is not directly supported by the programming of the new controller.

During and/or following completion of the conversion, the computing device 106 can generate a report including information associated with the conversion. The report can include, for example, bill of material metrics for migration from legacy controllers to new controllers. In some embodiments the report can include conflicts, violations, and/or resolutions thereto. In addition, the report can include relationship information, for instance, that details data points that are shared with (either to or from) other controllers of the legacy network. The relationship information can be converted from a type compatible with the legacy controller to a different type compatible with the new controller such that the new controller is configured to share the plurality of data points with the other controllers. Thus, the interconnected nature of the controller system can be maintained by mapping the relationships between controllers to their new counterparts.

The converted programming information can be communicated (e.g., migrated) to a second (e.g., new) controller. In some embodiments, for instance, the converted programming information can be downloaded to the new controller.

Once the programming information is converted and the functionalities of the controller 104 are migrated to the new controller, the controller 104 can be physically removed and the new controller installed. In some embodiments, the system device 102 and/or the wiring 103 can be retained. Thus, the wiring can be disconnected from the point 105-1, and the controller 104 can be removed.

Figure 1B:
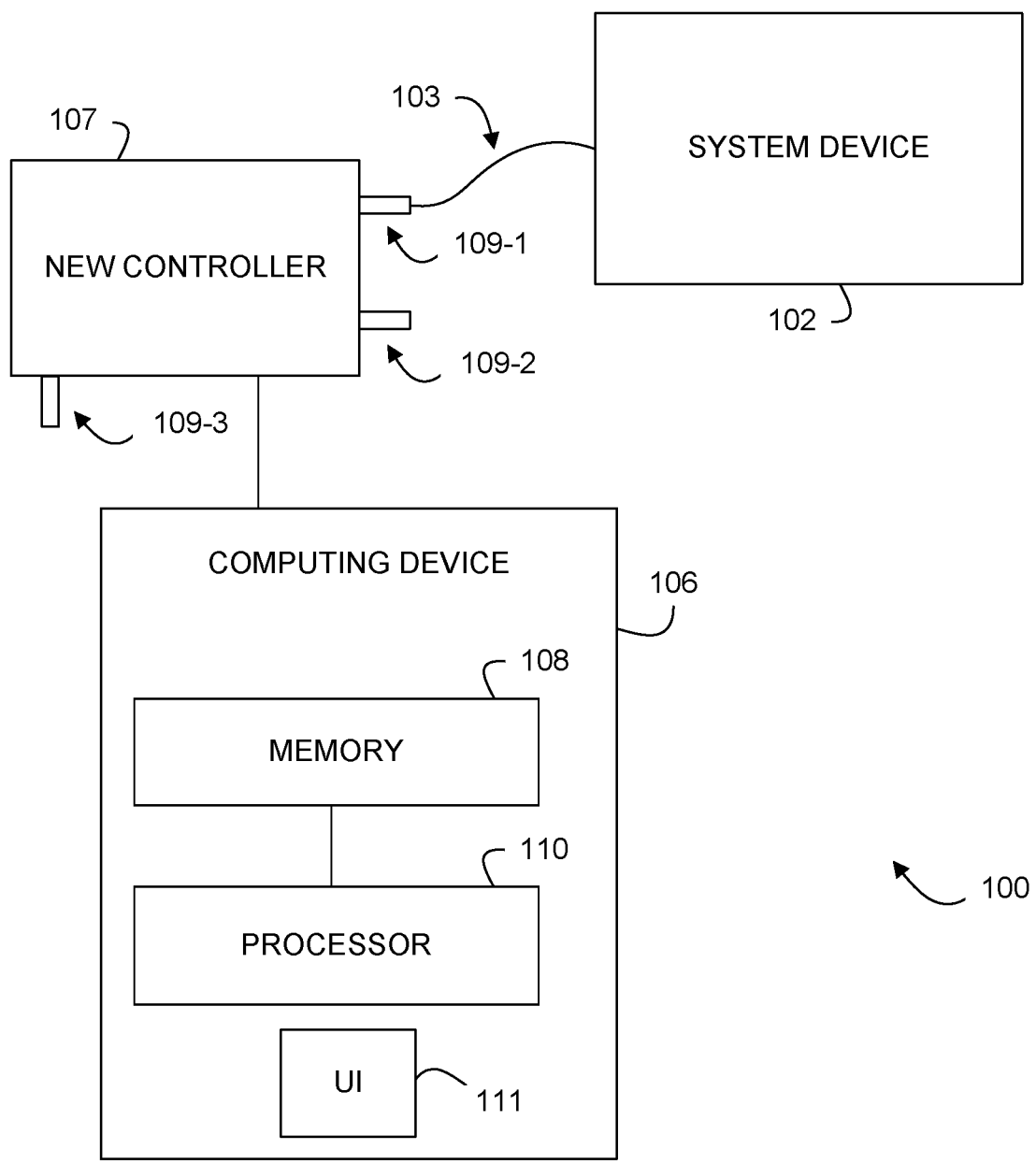
FIG. 1B illustrates another system in accordance with one or more embodiments of the present disclosure after a controller has been replaced with a new controller and the system has migrated to the use of the new controller.

FIG. 1B illustrates another system 100 after controller 104 has been replaced with a new controller 107 and the system has migrated to the use of the new controller 107. The wiring 103 can be connected to an appropriate point of the new controller 107, as illustrated in FIG. 1B.

As shown in FIG. 1B, the new controller is different than the controller 104 previously described in connection with FIG. 1A. For instance, the new controller 107 includes 3 points 109-1, 109-2, and 109-3. These points may be analogous to the previously described points 105 in some embodiments. In some embodiments, one or more of the points may differ from the points 105. For example, point 105-1 may be an analog input point while the point 109-1 may be an analog I/O point. Further, the new controller 107 may be a different type of controller than the controller 104. For example, the controller 104 may be a legacy controller type, while the new controller 107 may be an upgraded controller type.

The new controller 107 can be used to control one or more aspects of the system device 102. For instance, new controller 107 can execute the converted programming information received from the controller 104 to control the system device 102. In some embodiments, the new controller can provide functionalities and/or abilities that exceed those of the legacy controller 104.

Figure 2:
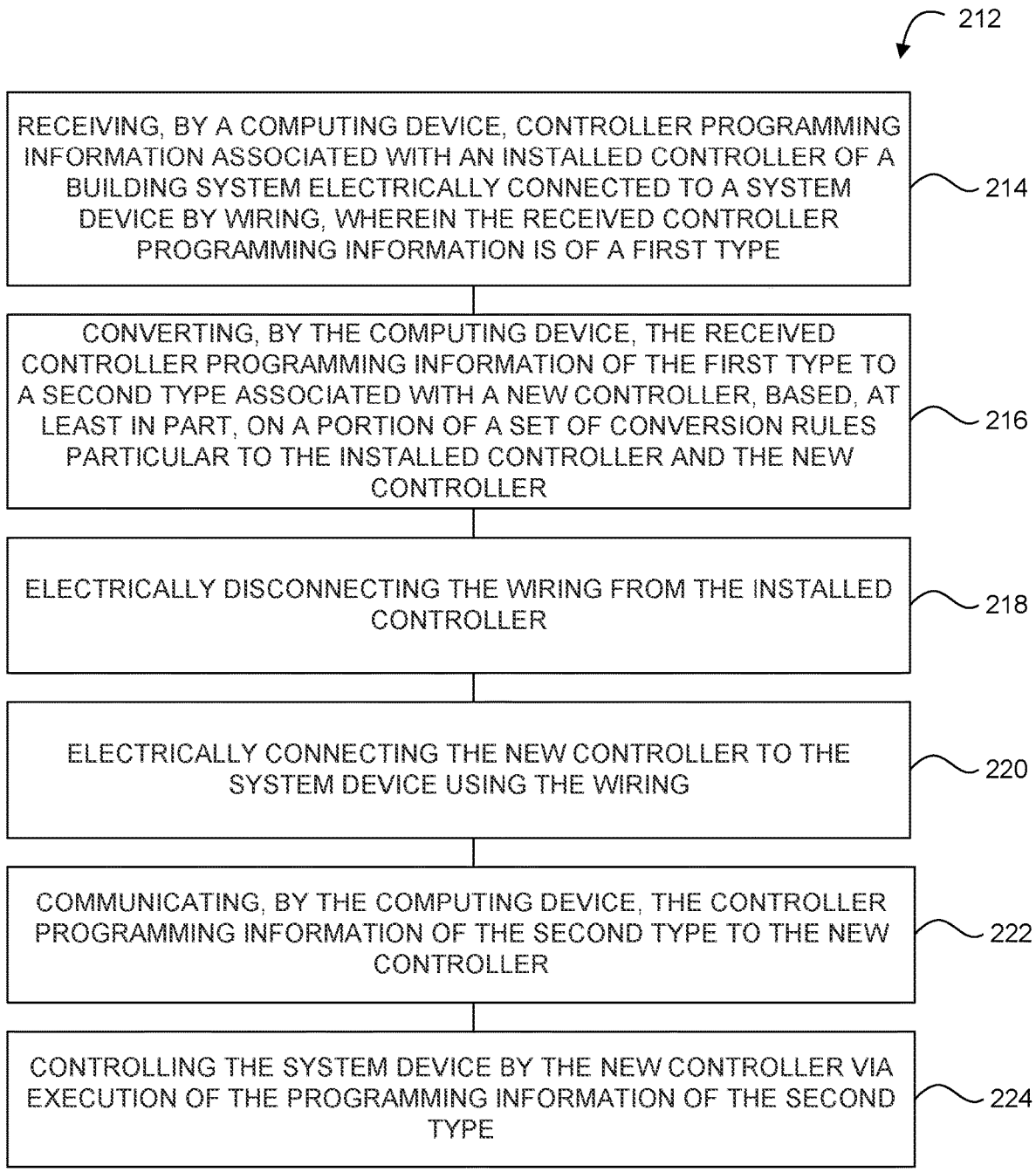
FIG. 2 illustrates a method for controller programming migration automation in accordance with one or more embodiments of the present disclosure

FIG. 2 illustrates a method 212 for controller programming migration automation in accordance with one or more embodiments of the present disclosure. The method 212 can be performed, at least in part, by a computing device (e.g., the computing device 106, previously described in connection with FIGS. 1A and/or 1B).

At block 214, the method 212 includes receiving, by a computing device, controller programming information associated with an installed controller of a building system that is electrically connected to a device of the building system by wiring, wherein the received controller programming information is of a first information type. The computing device, the installed controller, the system device, and/or the wiring can be analogous to those respectively described in connection with FIGS. 1A and/or 1B, for instance. The first type of controller programming information can refer to programming information that is compatible with, and/or executable by, the installed controller. For instance, the first type of controller programming information may be referred to as "legacy programming."

At block 216, the method 212 includes converting, by the computing device, the received controller programming information to a second information type associated with a new controller, based, at least in part, on a portion of a set of conversion rules particular to the installed controller and the new controller. The second type of controller programming information can refer to programming information that is compatible with, and/or executable by, the new controller. For instance, the second type of controller programming information may be referred to as "new programming."

At block 218, the method 212 includes electrically disconnecting the wiring from the installed controller. As previously described, the wiring may be disconnected at a point associated with the controller (e.g., an I/O point).

At block 220, the method 212 includes electrically connecting the new controller to the device of the building system using the wiring. As previously described, the same wiring may be used to connect the system device to the new controller (e.g., at an I/O point of the new controller).

At block 222, the method 212 includes communicating, by the computing device, the converted controller programming information to the new controller. The new controller can be loaded with the programming information such that it is configured to control one or more operations of the system device.

At block 224, the method 212 includes controlling the device of the building system using the new controller via execution of the converted programming information. The new controller, once connected, can be tested to determine whether its operations maintain the functionality of the legacy (e.g., installed) controller.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon which, when executed by a processor, cause the processor to:
   receive controller programming information associated with a first controller of a building system, wherein the received controller programming information is of a first information type, and wherein the controller programming information associated with the first controller includes instructions executable by a processor of the first controller to control a device of the building system;
   convert the received controller programming information to a second information type associated with a second controller of the building system, based, at least in part, on a set of conversion rules particular to the first controller and the second controller, wherein the controller programming information associated with the second controller includes instructions executable by a processor of the second controller to control the device of the building system; and
   generate a report including information associated with the conversion.

2. The medium of claim 1, wherein the received controller programming information is in a project documentation format.

3. The medium of claim 1, wherein the received controller programming information is in a binary file format.

4. The medium of claim 1, wherein the received controller programming information includes a set of computer-readable instructions stored in a database.

5. The medium of claim 1, wherein the first controller is of a first controller type and the second controller is of a second controller type.

6. The medium of claim 5, wherein the first controller type is a legacy controller type and the second controller type is an upgraded controller type.

7. The medium of claim 1, wherein the set of conversion rules defines a mapping between input/output points of the first controller and input/output points of the second controller.

8. The medium of claim 1, wherein the instructions to convert the received controller programming information to the second information type associated with the second controller include instructions to convert switching table logic of the received programming information to control logic of the second type.

9. The medium of claim 1, wherein the instructions to convert the received controller programming information to the second information type associated with the second controller include instructions to convert a first time schedule of the received programming information to a second time schedule of the second type.

10. The medium of claim 1, wherein the set of rules includes a first subset of rules modifiable by user input, and wherein the set of rules includes a second subset of rules not modifiable by user input.

11. A system for controller programming migration automation, comprising:
    a first controller;
    a second controller;
    a device of a building system electrically coupled to, and controlled by, the first controller; and
    a computing device configured to:
      receive controller programming information associated with the first controller, wherein the received controller programming information is of a first information type and includes instructions executable by a processor of the first controller to control the device of the building system;
      convert the received controller programming information to a second information type compatible with the second controller, based, at least in part, on a set of conversion rules wherein the converted programming information includes instructions executable by a processor of the second controller to control the device of the building system; and
      communicate the programming information of the second type to the second controller, wherein the second controller is configured to control the device of the building system by executing the instructions of the converted programming information upon receiving the converted programming information.

12. The system of claim 11, wherein the device of the building system is a sensor or an actuator.

13. The system of claim 11, wherein the computing device includes a user interface configured to receive inputs to modify the conversion of the received controller programming information.

14. The system of claim 13, wherein the user interface is configured to receive the inputs before the conversion occurs.

15. The system of claim 11, wherein the second controller is configured to be electrically coupled to the device of the building system and is configured to execute the converted programming information to control the device of the building system.

16. The system of claim 11, wherein the computing device includes a user interface is configured to receive a selection of the first controller from a list of controllers of the building system, wherein the selection of the first controller causes the controller programming information associated with the first controller to be received.

17. A method for controller programming migration automation, comprising:
   receiving, by a computing device, controller programming information associated with an installed controller of a building system that is electrically connected to a device of the building system by wiring, wherein the received controller programming information is of a first information type and includes instructions executable by the installed controller to control the device of the building system;
   converting, by the computing device, the received controller programming information to a second information type associated with a new controller, based, at least in part, on a portion of a set of conversion rules particular to the installed controller and the new controller, wherein the converted programming information includes instructions executable by the new controller to control the device of the building system;
   electrically disconnecting the wiring from the installed controller;
   electrically connecting the new controller to the device of the building system using the wiring;
   communicating, by the computing device, the converted controller programming information to the new controller; and
   controlling the device of the building system using the new controller via execution of the instructions of the converted programming information.

18. The method of claim 17, wherein the installed controller and the new controller are each a unitary controller or a plant controller.

19. The method of claim 17, wherein the method includes generating a report including relationship information of the first information type that details a plurality of data points that are shared with the installed controller and an additional installed controller of the building system.

20. The method of claim 19, wherein the method includes converting the relationship information of the first information type to the second information type such that the new controller is configured to share the plurality of data points with the additional installed controller.

* * * * *